United States Patent [19]

Nemeth

[11] 4,433,092
[45] Feb. 21, 1984

[54] GREEN CERAMIC OF LEAD-FREE GLASS, CONDUCTIVE CARBON, SILICONE RESIN AND ALPO$_4$, USEFUL, AFTER FIRING, AS AN ELECTRICAL RESISTOR

[75] Inventor: Joseph Nemeth, Harsens Island, Mich.

[73] Assignee: Champion Spark Plug Company, Toledo, Ohio

[21] Appl. No.: 424,194

[22] Filed: Sep. 27, 1982

Related U.S. Application Data

[63] Continuation-in-part of Ser. No. 241,490, Mar. 9, 1981, abandoned, which is a continuation-in-part of Ser. No. 230,404, Jan. 30, 1981, abandoned.

[51] Int. Cl.$^3$ .......................... H01C 7/00; C03C 3/08; C03C 3/16
[52] U.S. Cl. ........................ 524/414; 106/85; 252/506; 252/508; 252/509; 252/511; 315/58; 501/32; 501/44; 501/58; 501/59; 501/65; 501/66; 501/77; 524/588
[58] Field of Search ............... 501/32; 524/414, 588; 252/506, 507, 508, 509, 511; 315/58

[56] References Cited

U.S. PATENT DOCUMENTS

| | | | |
|---|---|---|---|
| 2,459,282 | 1/1949 | McDougal et al. | 315/58 |
| 2,526,059 | 10/1950 | Zabel et al. | 252/511 |
| 2,536,962 | 1/1951 | Sorg | 201/75 |
| 3,382,574 | 5/1968 | Chadwick | 29/610 |
| 3,627,551 | 12/1971 | Olstowski | 501/32 |
| 3,742,423 | 6/1973 | Chadwick | 252/511 |
| 3,909,459 | 9/1975 | Friese et al. | 252/509 |
| 3,931,084 | 1/1976 | Buckley et al. | 524/414 |
| 4,046,581 | 9/1977 | Cassidy | 106/85 |
| 4,051,074 | 9/1977 | Asada | 252/503 |
| 4,173,731 | 11/1979 | Takagi et al. | 315/58 |
| 4,345,179 | 8/1982 | Asai et al. | 315/58 |

FOREIGN PATENT DOCUMENTS 54-14719  2/1978  Japan ..................... 501/32

*Primary Examiner*—Helen M. McCarthy
*Attorney, Agent, or Firm*—John C. Purdue

[57] ABSTRACT

A lead-free green ceramic body useful after firing as an electrical resistor, and a method for producing such a resistor, are disclosed. The method preferably comprises the steps of preparing a uniform, finely-divided mixture by blending, by weight, substantially 69 percent of a glass frit with substantially 8 percent of AlPO$_4$, substantially 3 percent of conductive carbon and substantially 20 percent of a phenyl lower alkyl silicone resin which is curable to form a temporary binder for the conductive carbon and the glass frit. One preferred frit consists essentially of substantially 43 percent SiO$_2$, 20 percent B$_2$O$_3$, 21 percent Na$_2$O, 3 percent CaO, 8 percent BaO and 5 percent Li$_2$O. A shape is then pressed from the mixture; the shape is heated to 450–550 degrees F. for about 30 minutes and cooled to ambient temperature. Silver paint is then applied to the cooled shape and the painted shape is fired to vitrify the frit of the resistor. A lead-free carbon resistor according to the invention eliminates health hazards of human exposure to toxic lead compounds used in many resistors. A preferred resistor according to the invention also maintains an essentially constant resistance over time.

4 Claims, No Drawings

GREEN CERAMIC OF LEAD-FREE GLASS, CONDUCTIVE CARBON, SILICONE RESIN AND ALPO$_4$, USEFUL, AFTER FIRING, AS AN ELECTRICAL RESISTOR

REFERENCE TO RELATED APPLICATION

This is a continuation-in-part of application Ser. No. 241,490, filed Mar. 9, 1981, which, in turn, was a continuation-in-part of application Ser. No. 230,404, filed Jan. 30, 1981, both now abandoned.

BACKGROUND OF THE INVENTION

1. Field of the Invention

This invention relates to an improved lead-free carbon resistor and a method for producing such a resistor.

Carbon resistors are useful, for example, in spark plugs and igniters, to suppress electromagnetic radiation in the radio frequency range arising in connection with spark discharge; this radiation can interfere with the operation of television and radio communication equipment and other electronic apparatus.

2. Description of the Prior Art

Carbon resistors, for use as suppressors of electromagnetic radiation resulting from spark discharge, and which are composed, for example, of conductive carbon mixed with a silicone resin or organic resin binder and a filler such as a lead borosilicate glass, are well known. Similar resistors are also known where a lead borosilicate glass serves as a binder, rather than as a filler. Also, various methods for producing resistors of the indicated kinds have heretofore been known and used.

U.S. Pat. No. 3,742,423 discloses a carbon composition resistor and a method for producing the disclosed resistor. This patent describes a resistor having a body containing a conductor such as carbon black and/or graphite, a silicone resin binder, and a non-conductive filler selected from the group consisting of silica, mica, wollastonite, asbestos, glass and mixtures thereof. The method of this reference as disclosed involves mixing and pulverizing the above-described components at a temperature below that at which cure of the silicone resin takes place. The mixture is then formed in a die into a shaped body while a similar low temperature is maintained. The shaped body, after removal from the die, is heated to a temperature of from 400 to 750 degrees F., for from 20 minutes to 2 hours, to cure the silicone resin.

DEFINITION

The terms "percent" and "parts", as used therein and in the appended claims, refer to percent and parts by weight, unless otherwise indicated.

BRIEF DESCRIPTION OF THE INVENTION

The instant invention is based upon the discovery of an improved lead-free green ceramic body useful after firing as an electrical resistor, and of a method for producing such a resistor.

A resistor produced according to the invention, when properly assembled, for example in a spark plug, can help to suppress electromagnetic interference (EMI) resulting from sparking of the plug, which can be detrimental to the use of communications equipment and other electronic devices. Furthermore, a resistor produced from a green ceramic body, and which is composed of constituents in the ranges contemplated by the invention, is free of toxic lead, which is known to be harmful both to workers involved in manufacturing operations and to the environment. In addition, a resistor having one of several preferred compositions within these ranges is particularly and unexpectedly advantageous even by comparison with other operable compositions because it exhibits substantially constant resistance after extensive use, for example, as a suppressor in a spark plug.

A resistor produced according to the instant invention can have an electrical resistance, after firing, of from 7,800 to 13,100 ohms, and is a body produced by a firing a green ceramic body consisting essentially, on a solids basis, of from 60 to 75 percent of a lead-free glass frit, from 5 to 15 percent AlPO$_4$, from $\frac{1}{4}$ to 4 percent conductive carbon and from 15 to 30 percent of a phenyl lower alkyl silicone resin. The glass frit, in one embodiment, can consist essentially of from 0 to 5 percent Al$_2$O$_3$, from 25 to 45 percent SiO$_2$, from 17 to 25 percent B$_2$O$_3$, from 10 to 25 percent Na$_2$O, from 0 to 2 percent K$_2$O, from 2 to 10 percent CaO, from 5 to 20 percent BaO, from 2 to 5 percent Li$_2$O, from 0 to 2 percent MgO, from 0 to 2 percent TiO$_2$, from 0 to 2 percent MoO$_3$ and from 0 to 4 percent F. The frit, in another embodiment, can also consist essentially of substantially 30 percent SiO$_2$, 2 percent P$_2$O$_5$, 5 percent B$_2$O$_3$ 10 percent Na$_2$O, 10 percent K$_2$O, 10 percent Li$_2$O, 30 percent TiO$_2$ and 3 percent Fe$_2$O$_3$, or of substantially 21 percent Al$_2$O$_3$, 44 percent P$_2$O$_5$, 7 percent B$_2$O$_3$, 21 percent Na$_2$O, 3 percent Li$_2$O and 4 percent F. Preferably, the green ceramic body consists essentially, on a solids basis, of substantially 69 percent of an optimum glass frit, substantially 8 percent AlPO$_4$, substantially 3 percent of a conductive carbon blend consisting essentially of 50 percent calcined lampblack and 50 percent graphite, and substantially 20 percent of the phenyl lower alkyl silicone resin. The optimum glass frit, depending upon the intended application can consist essentially of substantially 43 percent SiO$_2$, 20 percent B$_2$O$_3$, 21 percent Na$_2$O, 3 percent CaO, 8 percent BaO and 5 percent Li$_2$O; 43 percent SiO$_2$, 20 percent B$_2$O$_3$, 16 percent Na$_2$O, 8 percent CaO, 8 percent BaO, and 5 percent Li$_2$O; or 2 percent Al$_2$O$_3$, 41 percent SiO$_2$, 19 percent B$_2$O$_3$, 13 percent Na$_2$O, 1 percent K$_2$O, 9 percent CaO, 9 percent BaO, 4 percent Li$_2$O, 1 percent MgO and 1 percent TiO$_2$.

A method for producing a resistor according to the invention can comprise the steps of:

(1) preparing a uniform, finely-divided mixture by blending the glass frit, the AlPO$_4$, the conductive carbon and the silicone resin;
(2) pressing a shape from the mixture;
(3) heating the shape at a temperature within the range of 450–550 degrees F. for a period of about 30 minutes;
(4) cooling the heated shape to ambient temperature;
(5) applying electrical contacts to the cooled shape; and
(6) firing the shape and contacts to a temperature and for a time sufficient to vitrify the frit of the resistor.

DETAILED DESCRIPTION OF THE INVENTION

The lead-free green ceramic body useful after firing as a resistor, and the method for producing a lead-free carbon resistor, both provided by the present invention, will be more fully understood by reference to the following EXAMPLES. EXAMPLE I-III describe procedures for producing such resistors which were performed according to preferred embodiments of the invention, and constitute the best presently known modes.

EXAMPLE I

Lead-free green ceramic bodies, useful after firing as carbon resistor elements, were prepared from 54.4 g. of mono aluminum phosphate, 121.3 g. of a phenyl lower alkyl silicone resin, (the resin used is commercially available from Dow Corning Corporation under the designation "DC-840 Resin") 11.0 g. of conductive carbon consisting essentially of a calcined lampblack and graphite mixture, (the lampblack used is commercially available under the designation "Excelsior Lampblack-Electric Calcined" and the graphite used is commercially available under the designation "Superior Superflake Graphite No. 3735") 50 percent of each, and 249.5 g. of a lead-free glass frit. The frit consisted essentially of 43.1 percent $SiO_2$, 20.0 percent $B_2O_3$, 21.4 percent $Na_2O$, 2.8 percent CaO, 7.7 percent BaO and 5.0 percent $Li_2O$. The indicated ingredients were blended in a mixer which was first preheated to 200 degrees F., and to which the conductive carbon mixture and the frit were first charged and mixed together for a period of about 10 minutes; the mono aluminum phosphate, in the form of an aqueous solution containing 50 percent solids, was then charged into the mixer while mixing was continued. The silicone resin (60 percent solids in toluene) was then gradually charged to the mixer over a period of about 20 minutes, and mixing was continued until the smooth-appearing mixture which formed initially began to break-up—a total mixing time of about 6 hours. The mixer was then emptied and its contents were spread out as uniformly as possible in a shallow pan. The mixture in the pan was allowed to air-dry at ambient temperature (about 70 degrees F.) for approximately 24 hours. During air-drying, the mixture hardened sufficiently to enable further processing as described below.

Next, the dried mixture was granulated and the resulting granules were reduced in size by successive passage through a grinder and a pulverizer. The ground and pulverized material which resulted was screened through a Tyler No. 166 Toncap screen; that portion of the material which did not pass through the screen was returned for re-grinding and re-pulverizing as described above. A 100.0 g. portion of the uniform mixture which passed through the screen was then charged into a cone blender and a small quantity (about 0.4 g.) of zinc stearate was added; the zinc stearate was not an active ingredient but was added solely to function as a lubricant to facilitate die release during subsequent pressing of green ceramic shapes from the mixture, as described below. This mixture, containing the added zinc stearate, was tumbled in the blender for about 4 minutes; the blender was then stopped and the blended material was removed and charged into the feed hopper of a conventional press used for producing green ceramic shapes.

A 0.2 portion of the blended material from the feed hopper was charged to each of 10 molds of the press; each mold had a right circular cylindrical cavity about 0.452 inch in length by 0.140 inch in diameter. The press was then closed, pressure about 25,000 psi, to produce ten green ceramic shapes, each having the length and diameter of its mold cavity. The pressed shapes were removed from the molds; two were tested destructively and found to have satisfactory green strength. The eight remaining shapes were inspected visually and found to have no laminations or other visible defects. The eight shapes were then placed on stainless steel trays, heated in an oven at a temperature of approximately 500 degrees F. for about 30 minutes, and cooled in air to ambient temperature.

Both ends of each cooled shaped were dipped in a coating composition produced by mixing 33 parts of a lead borosilicate frit composition with 67 parts of du Pont silver paint No. OA 0921 which had a solids content of 73 percent dispersed in a predominantly xylene solvent system. The solids were 81 percent silver powder and 19 percent lead borosilicate frit. The coating composition was diluted to a desired viscosity with xylene. The lead borosilicate frit composition was substantially minus 200 mesh (U.S. Sieve Series) material, and consisted essentially, on a solids basis, of 77 percent of a lead borosilicate glass frit, 6 percent $AlPO_4$, 1 percent of conductive carbon and 16 percent of a phenyl lower alkyl silicone resin ("DC-840 Resin"). The glass frit consisted essentially of 19.9 percent $SiO_2$, 14.5 percent $B_2O_3$, 59.2 percent PbO and 6.4 percent $Na_2O$. After this dipping a layer of paint about 0.002 inch thick covered the ends of each shape. The distance between the silver coatings, applied to serve as electrical contacts, was 0.437 inch. The painted shapes were passed through an oven heated to about 250 degrees F., after which the paint was dry to the touch. The painted shapes were then transferred to a furnace and fired at approximately 1020 degrees F. for about 20 minutes to vitrify the frit. The fired shapes, finished electrical resistors, were found by visual inspection to be free of defects such as blisters (which would indicate excessive frit penetration through the silvering), cracks and other physical defects.

EXAMPLE II

Eight finished resistors were produced, using substantially the ingredients and procedure described in EXAMPLE I, with the exception that the mixer was first preheated to 225 degrees F., and the lead-free glass frit consisted essentially of 43.1 percent $SiO_2$, 20.0 percent $B_2O_3$, 16.3 percent $Na_2O$, 7.8 percent CaO, 7.7 percent BaO and 5.0 percent $Li_2O$.

EXAMPLE III

Eight finished resistors were produced, using substantially the ingredients and procedure described in EXAMPLE I, with the exception that the mixer was first preheated to 225 degrees F., and the lead-free glass frit consisted essentially of 1.8 percent $Al_2O_3$, 40.8 percent $SiO_2$, 19.2 percent $B_2O_3$, 12.9 percent $Na_2O$, 0.8 percent $K_2O$, 9.3 percent CaO, 8.9 percent BaO, 4.3 percent $Li_2O$, 1.0 percent MgO and 1.0 percent $TiO_2$.

EXAMPLE IV

Eight finished resistors were produced, using substantially the ingredients and procedure described in EXAMPLE I, with the exception that the lead-free green ceramic bodies were prepared from 52.0 g. mono aluminum phosphate, 159.5 g. of the phenyl lower alkyl silicone resin, 7.5 g. of the conductive carbon mixture and 282.0 g. of a lead-free glass frit consisting essentially of 27.0 percent $SiO_2$, 20.9 percent $B_2O_3$, 21.3 percent $Na_2O$, 4.8 percent CaO, 19.3 percent BaO, 2.3 percent $Li_2O$, 1.2 percent $MoO_3$ and 3.2 percent F.

EXAMPLE V

Eight finished resistors were produced, using substantially the ingredients and procedure described in EXAMPLE I, with the exception that the silicon resin used was one commercially available from Dow Corning Corporation under the designation "DC-804 Resin", and the lead-free glass frit used consisted essentially of 21.0 percent $Al_2O_3$ 43.5 percent $P_2O_5$, 7.1 percent $B_2O_3$, 21.5 percent $Na_2O$, 3.4 percent $Li_2O$ and 3.5 percent F.

EXAMPLE VI

Eight finished resistors were produced, using substantially the procedure and ingredients described in EXAMPLE I, with the exception that the lead-free glass frit used consisted essentially of 30.0 percent $SiO_2$, 1.9 percent $P_2O_5$, 4.9 percent $B_2O_3$, 10.6 percent $Na_2O$, 10.0 percent $K_2O$, 9.9 percent $Li_2O$, 30.0 percent $TiO_2$ and 2.7 percent $Fe_2O_3$.

The resistors produced as described in the foregoing EXAMPLES were tested for resistance and life expectancy. The initial resistance of each resistor was approximately 10,000 ohms. The resistors were then used to produce conventional automotive-type suppressor spark plug assemblies. The resistance of each resistor, in the spark plug assembly, was found to be about 10,000 ohms. These resistance values were found to decrease under ambient conditions, by about 5 percent over the first 20 days, after which the resistances were found to stabilize at values between 9,300 and 10,700 ohms.

The spark plug assemblies were then mounted, 20 foot pounds torque, in conventional resistance endurance testing apparatus. The assemblies were first tested for, and found to be free of leaks, using carbon dioxide at a pressure of about 100 psi. The plug assemblies then were subjected, in the testing apparatus, to carbon dioxide at a pressure of about 100 psi and a temperature of approximately 500 degrees F., for about 120 hours. Immediately after this period, the resistance of each resistor was found to be between 7,000 and 13,000 ohms.

The resistors produced according to the procedures described in EXAMPLES IV-VI, above, after assembly into spark plugs, had an initial resistance of 10,000 ohms, and performed satisfactorily under resistance endurance testing, as described above. However, these spark plugs were deemed less desirable for use because thereafter resistance was found to increase steadily with standing under ambient conditions, exceeding 13,000 ohms after 200 days. In comparison, the spark plugs which contained the resistors produced as described in EXAMPLES I-III, were unexpectedly found to have retained a resistance of about 10,000 ohms after standing for 200 days. Thus, resistors produced according to these preferred embodiments of the invention are particularly advantageous in that they maintain a substantially constant resistance over time.

In the foregoing EXAMPLES, resistors produced accordingly to preferred embodiments of the invention were of a cylindrical shape, having been fabricated from a substantially green ceramic body pressed in a cylindrical mold cavity having dimensions of 0.452 inch in length by 0.140 inch in diameter. It will be appreciated, however, that a resistor produced according to the present invention can be of any desired shape; for example, disks or larger or smaller cylindrical bodies than that previously described can be made. The preceding EXAMPLES also described a resistor having metallic silver electrical contacts applied by painting the ends thereof. In the practice of the present invention, the contacts can also be applied, for example, by flame spraying, and any suitable electrically-conducting material can be used in place of the silver paint specifically described herein, for example platinum, gold, copper, bronze and Monel. Electrical contacts such as wire leads molded into the resistor body or various metallic conductors pressed onto the ends thereof can also be used.

The mixture of ingredients prepared and used in a method for producing a resistor according to the invention is composed largely of a lead-free glass, which is believed to function as a permanent binder for a resistor produced from the mixture. The phenyl lower alkyl silicone resin functions as a temporary binder until the relatively low temperature baking (about 500 degrees F.) of the green ceramic body after pressing, after which the mono aluminum phosphate is believed to function as a medium temperature binder. This latter constituent, added to the mixture of components of the green ceramic of the invention as a 50% aqueous solution, and the silicone resin, added thereto as a 60% solids solution in toluene, are believed to assist also in producing a uniform, finely-divided mixture during the initial mixing of the components of the mixture.

The conductive carbon added, according to the invention, to the extent of from $\frac{1}{2}$ to 4 percent of the total mixture, can be added in slightly greater or lesser amounts depending upon the specific resistance desired for the end product. While the proportion of conductive carbon in the mixtures of the Examples has been found to produce a preferred product of suitable size having, after firing, a resistance of about 10,000 ohms, the amount of the conductor in the mixtures can be varied from that preferred proportion if a resistor is desired, for example, having a resistance closer to 7,800 ohms or to 13,100 ohms, or if required because of a change in the size of the resistor. A product of lower specific resistance can be produced by any number of methods; however, adding a small amount of carbon conductor to the finely-divided, uniform screened mixture, prior to pressing a shape from that mixture, is preferred. Preferably, the amount of conductor added will not be more than 1.0 percent of the total mixture, an insignificant quantity in terms of the total composition. If, on the other hand, a higher specific resistance is desired, slightly less of the conductor can be added during the initial mixing operation; again, it is preferred that the amount of the decrease not exceed 1.0 percent of the total composition. It will be appreciated that, in actual mass production of resistors according to the invention, the above-described adjustments and others—for example, changes of the pressure used to form a shape from the mixture—can be accomplished to produce bodies having various resistances, including ones within the 7,800 to 13,100 ohm range specified herein. Furthermore, the proportion of conductive carbon can be controlled to compensate for inherent but small variations in the resistance characteristics of the commercial raw materials to achieve a desired resistance according to the invention.

It will be appreciated that any suitable phenyl lower alkyl silicone resin can be used in producing a green ceramic article according to the invention; a suitable resin is one which is curable to form a temporary binder for the conductive carbon and the glass frit, and in which the total of phenyl and lower alkyl groups divided by the number of silicone atoms is from 0.9 to 1.9. Preferably, the alkyl groups have not more than 4 carbon atoms. In particular, the silicone resins available from Dow Corning Corporation under the trade designations "DC-840 Resin" and "DC-804 Resin" are suitable; these resins as commercially supplied contain approximately 40% toluene as a solvent. Other suitable resins for use in the instant invention include, for example, the General Electric resins designated "SR 82", "SR 182" and "SR 323".

In the practice of the method of the invention, it is preferred that the final firing temperature of the ceramic shape be within the range of 1000–1100 degrees F., and preferably about 1020 degrees F. The latter temperature has been found to be sufficient to enable a correct bond structure to form between the constituents of the resistor body in a reasonable time. Whatever firing temperature within the above range is used, however, it is important that one be selected which will enable a glossy-appearing surface to form on the resistor. A glossy surface indicates a correct bond structure, while a firing temperature too high can blister and severely damage the electrical contacts.

Any number of procedures and variations of procedures for achieving the objects and advantages of the instant invention are possible. The foregoing disclosure, including the embodiments described in the preceding Examples, is not intended as a limitation thereon except as defined in the following claims.

What I claim is:

1. A lead-free green ceramic body useful after firing as an electrical resistor and consisting essentially, on a solids basis, of from 60 to 75 percent of a glass frit, from 5 to 15 percent AlPO$_4$, from ¼ to 4 percent conductive carbon and from 15 to 30 percent of a temporary binder which is a cured phenyl lower alkyl silicone resin, and wherein the glass frit consists essentially of from 0 to 5 percent Al$_2$O$_3$, from 25 to 45 percent SiO$_2$, from 17 to 25 percent B$_2$O$_3$, from 10 to 25 percent Na$_2$O, from 0 to 2 percent K$_2$O, from 2 to 10 percent CaO, from 5 to 20 percent BaO, from 2 to 5 percent Li$_2$O, from 0 to 2 percent MgO, from 0 to 2 percent TiO$_2$, from 0 to 2 percent MoO$_3$ and from 0 to 4 percent F or consists essentially of substantially 30 percent SiO$_2$, 2 percent P$_2$O$_5$, 5 percent B$_2$O$_3$, 10 percent Na$_2$O, 10 percent K$_2$O, 10 percent Li$_2$O, 30 percent TiO$_2$ and 3 percent Fe$_2$O$_3$ or consists essentially of substantially 21 percent Al$_2$O$_3$, 44 percent P$_2$O$_5$, 7 percent B$_2$O$_3$, 21 percent Na$_2$O, 3 percent Li$_2$O, and 4 percent F.

2. A ceramic body as claimed in claim 1 consisting essentially, on a solids basis, of substantially 69 percent of a glass frit, substantially 8 percent AlPO$_4$, substantially 3 percent conductive carbon and substantially 20 percent of a temporary binder which is a cured phenyl lower alkyl silicone resin, and wherein the glass frit consists essentially of substantially 43 percent SiO$_2$, 20 percent B$_2$O$_3$, 21 percent Na$_2$O, 3 percent CaO, 8 percent BaO and 5 percent Li$_2$O.

3. A ceramic body as claimed in claim 1 consisting essentially, on a solids basis, of substantially 69 percent of a glass frit, substantially 8 percent AlPO$_4$, substantially 3 percent conductive carbon and substantially 20 percent of a temporary binder which is a cured phenyl lower alkyl silicone resin, and wherein the glass frit consists essentially of substantially 43 percent SiO$_2$, 20 percent B$_2$O$_3$, 16 percent Na$_2$O, 8 percent CaO, 8 percent BaO and 5 percent Li$_2$O.

4. A ceramic body as claimed in claim 1 consisting essentially, on a solids basis, of substantially 69 percent of a glass frit, substantially 8 percent AlPO$_4$, substantially 3 percent conductive carbon and substantially 20 percent of a temporary binder which is a cured phenyl lower alkyl silicone resin, and wherein the glass frit consists essentially of substantially 2 percent Al$_2$O$_3$, 41 percent SiO$_2$, 19 percent B$_2$O$_3$, 13 percent Na$_2$O, 1 percent K$_2$O, 9 percent CaO, 9 percent BaO, 4 percent Li$_2$O, 1 percent MgO and 1 percent TiO$_2$.

* * * * *